(12) United States Patent
Westerbeke, Jr.

(10) Patent No.: US 8,359,843 B2
(45) Date of Patent: *Jan. 29, 2013

(54) CONTROLLING EXHAUST TEMPERATURES

(75) Inventor: John H Westerbeke, Jr., Milton, MA (US)

(73) Assignee: WBIP, LLC, Taunton, MA (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/791,691

(22) Filed: Jun. 1, 2010

(65) Prior Publication Data

US 2010/0240268 A1   Sep. 23, 2010

Related U.S. Application Data

(63) Continuation of application No. 11/557,431, filed on Nov. 7, 2006, now Pat. No. 7,726,120, which is a continuation of application No. 09/862,973, filed on May 22, 2001, now Pat. No. 7,311,066.

(60) Provisional application No. 60/206,050, filed on May 22, 2000.

(51) Int. Cl.
  *F01N 3/00* (2006.01)
(52) U.S. Cl. .............. 60/298; 60/302; 60/320; 60/321; 440/88 G; 440/88 J; 440/89 R; 440/89 C
(58) Field of Classification Search ............ 60/274, 60/298, 299, 302, 310, 319, 320, 321; 440/88 G, 440/88 J, 89 R, 89 B, 89 C
See application file for complete search history.

(56) References Cited

U.S. PATENT DOCUMENTS

| | | | |
|---|---|---|---|
| 3,791,146 A | 2/1974 | Hayashi | |
| 4,068,612 A | 1/1978 | Meiners | |
| 4,091,616 A | 5/1978 | Loweg | |
| 4,178,873 A | 12/1979 | Bankstahl | |
| 4,214,443 A | 7/1980 | Herenius | |
| 4,273,080 A | 6/1981 | Pluequet | |
| 4,463,709 A | 8/1984 | Pluequet | |
| 4,573,318 A | 3/1986 | Entringer et al. | |
| 4,663,934 A | 5/1987 | Sickels | |
| 4,900,282 A | 2/1990 | Takahashi et al. | |
| 4,972,809 A | 11/1990 | Hirasawa | |
| 4,987,953 A | 1/1991 | Hedstrom | |
| 4,991,546 A | 2/1991 | Yoshimura | |
| 5,058,660 A | 10/1991 | Hedstrom | |
| 5,067,448 A | 11/1991 | Nakase et al. | |
| 5,125,231 A | 6/1992 | Patil et al. | |
| 5,203,167 A | 4/1993 | Lassanske et al. | |
| 5,209,062 A | 5/1993 | Vollenweider | |
| 5,212,949 A * | 5/1993 | Shiozawa | 60/298 |
| 5,239,825 A | 8/1993 | Shibata | |
| 5,253,613 A | 10/1993 | Bailey et al. | |
| 5,272,874 A | 12/1993 | Paas | |
| 5,311,738 A | 5/1994 | Huster et al. | |

(Continued)

FOREIGN PATENT DOCUMENTS

| | | |
|---|---|---|
| CH | 679460 A5 | 2/1992 |
| DE | 2345383 A1 | 3/1975 |

(Continued)

*Primary Examiner* — Binh Q Tran
(74) *Attorney, Agent, or Firm* — Fish & Richardson P.C.

(57) ABSTRACT

An exhaust manifold cooling jacket has internal passages for the circulation of liquid coolant and encloses an exhaust manifold such that a gap is created between the exhaust manifold and cooling jacket. Flowing coolant through the jacket regulates outer jacket temperature while enabling high intra-manifold exhaust gas temperatures for thorough intra-manifold combustion and improved emissions. A liquid-cooled exhaust system includes a turbocharger disposed between manifold and elbow, with liquid coolant flowing from manifold to elbow through the turbocharger. Another liquid-cooled exhaust manifold contains an internal exhaust combustion catalyst wrapped in an insulating blanket. In some marine applications, seawater or fresh water coolant is discharged into the exhaust gas stream at an attached exhaust elbow.

9 Claims, 9 Drawing Sheets

U.S. PATENT DOCUMENTS

| | | | |
|---|---|---|---|
| 5,366,401 A | 11/1994 | Nanami et al. | |
| 5,408,827 A | 4/1995 | Holtermann et al. | |
| 5,463,867 A | 11/1995 | Ruetz | |
| 5,488,826 A | 2/1996 | Paas | |
| 5,536,477 A | 7/1996 | Cha et al. | |
| 5,546,748 A | 8/1996 | Iwai et al. | |
| 5,619,956 A | 4/1997 | Koziara et al. | |
| 5,809,773 A | 9/1998 | Gottberg | |
| 5,809,776 A | 9/1998 | Holtermann et al. | |
| 5,813,222 A | 9/1998 | Appleby | |
| 5,829,249 A | 11/1998 | VanRens | |
| 5,873,330 A | 2/1999 | Takahashi et al. | |
| 5,899,063 A | 5/1999 | Leistritz | |
| 5,911,608 A | 6/1999 | Nakayama et al. | |
| 5,911,609 A | 6/1999 | Fujimoto et al. | |
| 5,921,076 A | 7/1999 | Krutzsch et al. | |
| 5,937,637 A | 8/1999 | Fujishita et al. | |
| 6,044,643 A | 4/2000 | Ittner et al. | |
| 6,047,542 A | 4/2000 | Kinugasa et al. | |
| 6,116,022 A | 9/2000 | Woodward | |
| 6,120,335 A | 9/2000 | Nakase et al. | |
| 6,122,909 A | 9/2000 | Murphy et al. | |
| 6,122,910 A | 9/2000 | Hoshi et al. | |
| 6,149,478 A | 11/2000 | Lehmann | |
| 6,155,896 A | 12/2000 | Suzuki | |
| 6,250,976 B1 * | 6/2001 | Ozawa | 440/1 |
| 6,309,268 B1 | 10/2001 | Mabru | |
| 6,360,702 B1 | 3/2002 | Osada | |
| 6,432,368 B1 | 8/2002 | Feitelberg et al. | |
| 6,435,925 B1 | 8/2002 | Mabru | |
| 6,446,431 B1 | 9/2002 | Brück | |
| 6,461,208 B2 * | 10/2002 | Suzuki et al. | 440/89 R |
| 6,511,355 B1 * | 1/2003 | Woodward | 440/89 H |
| 6,551,156 B2 * | 4/2003 | Nakamura et al. | 440/88 F |
| 6,558,214 B2 * | 5/2003 | Nanami | 440/88 R |
| 6,579,137 B2 | 6/2003 | Mabru | |
| 6,612,885 B2 * | 9/2003 | Yamazaki et al. | 440/89 C |
| 6,655,341 B2 | 12/2003 | Westerbeke | |
| 6,662,555 B1 | 12/2003 | Ishii | |
| 7,311,066 B1 | 12/2007 | Westerbeke | |
| 7,726,120 B2 * | 6/2010 | Westerbeke | 60/298 |

FOREIGN PATENT DOCUMENTS

| | | |
|---|---|---|
| EP | 928885 A2 | 7/1999 |
| WO | WO9747863 A1 | 12/1997 |

* cited by examiner

CONTROLLING EXHAUST TEMPERATURES

This application is a continuation (and claims the benefit of priority under 35 USC 120) of U.S. application Ser. No. 11/557,431, filed Nov. 7, 2006 now U.S. Pat. No. 7,726,120, which is a continuation of U.S. application Ser. No. 09/862,973, filed May 22, 2001 now U.S Pat. No. 7,311,066, which claims priority from U.S. provisional application Ser. No. 60/206,050, filed May 22, 2000. The disclosures of the prior applications are considered part of (and incorporated in) the disclosure of this application.

TECHNICAL FIELD

This application claims priority from U.S. Provisional application Ser. No. 60/206,050, filed May 22, 2000, which is incorporated herein by reference.

This invention relates to cooling engine exhaust manifolds and related components, and more particularly to controlling the temperature of engine exhaust components and the exhaust gasses flowing through them.

BACKGROUND

The exhaust gasses flowing through an exhaust gas manifold of an internal combustion engine are typically very hot, and the exhaust manifold itself may reach very high surface temperatures. To keep the outer surface temperature of the exhaust manifold down for safety reasons, some exhaust manifolds are water cooled, meaning that they contain inner passages through which cooling water flows during engine operation or that they are placed within jackets with cooling water flowing directly across the outer surface of the manifold. Indeed, there are some regulations requiring that exhaust manifolds be provided with cooling jackets for particular applications, such as for marine vessel inspections.

SUMMARY

In one aspect, the invention features a cooling jacket having internal passages for flowing water or other coolant through the jacket to moderate jacket temperature. The jacket attaches to the engine cylinder head to enclose and cool the exhaust manifold of the engine, thereby moderating the temperature of the exhaust gas flowing through the manifold and blocking the outer surface of the manifold from unwanted contact with nearby objects or personnel. As the coolant flows through internal passages in the manifold rather than through or across the exhaust manifold, the coolant never comes into contact with the manifold itself. Manifold cooling is achieved via radiant and convective heat transfer to the jacket when an air gap is provided between the outer surfaces of the manifold and the inner surfaces of the cooling jacket, or by conduction through an insulating material placed between the manifold and jacket. Among the various aspects of the invention are the cooling jacket so described, engines equipped with such cooling jackets, and methods of cooling engine exhaust manifolds by incorporating such jackets.

In some embodiments the cooling jacket defines a coolant inlet and a coolant outlet that are both separate from the exhaust stream. In some other cases, particularly applicable to marine engines, for example, coolant enters the jacket through a separate inlet but then joins the exhaust flow as the exhaust leaves the manifold, thereby further reducing exhaust gas temperature.

In another aspect, the invention features a liquid-cooled turbocharger disposed between a liquid-cooled exhaust manifold and a liquid-cooled exhaust elbow, such that manifold cooling fluid flowing to the elbow flows through and cools the housing containing the turbocharger. Preferably, for marine applications, for instance, the cooling fluid is injected into the exhaust stream downstream of the turbocharger, such as in the elbow. In some cases, the manifold cooling fluid flows through the exhaust manifold itself. In some other cases, the fluid cools the manifold by flowing through a channel within a jacket that surrounds the manifold, as discussed above.

In some embodiments, the manifold houses an exhaust conversion catalyst. The exhaust conversion catalyst is arranged within the exhaust stream, such that the exhaust flows through the catalyst, and is isolated from the liquid coolant, which flows around the catalyst. Preferably, the flow of liquid coolant joins the flow of exhaust downstream of the catalyst. In some embodiments, an insulating blanket is placed between the catalyst and the manifold housing to help to insulate the hot catalyst from the surrounding housing, thereby promoting exhaust conversion and avoiding excessive external surface temperatures. The blanket can, in some cases, also help to protect fragile catalysts from shock damage.

In another aspect of the invention, a liquid-cooled exhaust manifold houses an exhaust conversion catalyst arranged within the exhaust stream, such that the exhaust flows through the catalyst, and is isolated from the liquid coolant, which flows around the catalyst. The manifold is adapted to receive and join separate flows of exhaust gas and direct them through the catalyst. The manifold comprises a one-piece housing, preferably of cast metal, forming the internal exhaust flow passages and cavity for receiving the catalyst.

Some aspects of the invention can provide for the ready modification of engines to comply with exhaust manifold cooling requirements, without having to modify the exhaust manifold to either provide for internal cooling or withstand prolonged surface contact with a desired coolant. Furthermore, the temperature of the exhaust gas within the manifold can be maintained at a higher temperature than with normally cooled manifolds, given a maximum allowable exposed surface temperature, enabling more complete intra-manifold combustion and improving overall emissions. Among other advantages, some aspects of the invention help to maintain high exhaust temperatures, such as to promote exhaust catalytic conversion, for example, without producing undesirably high external surface temperatures.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
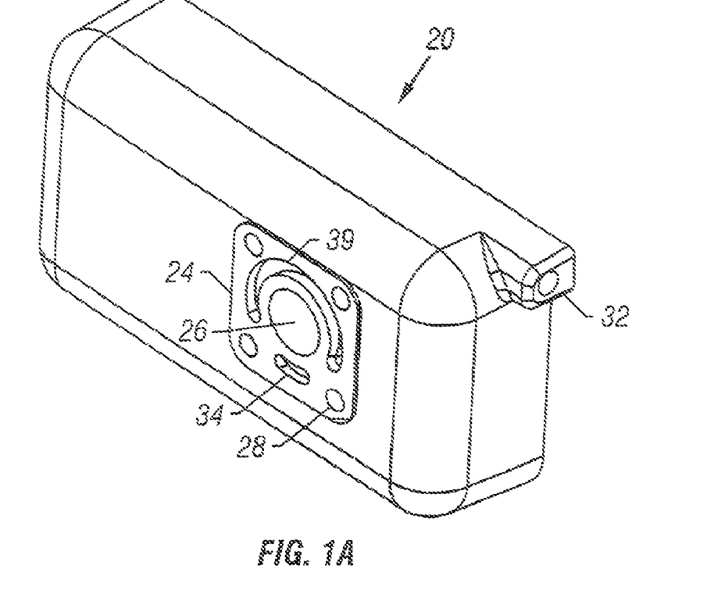
FIGS. 1A and 1B are front and back perspective views, respectively, of an exhaust manifold cooling jacket.
Figure 1B:
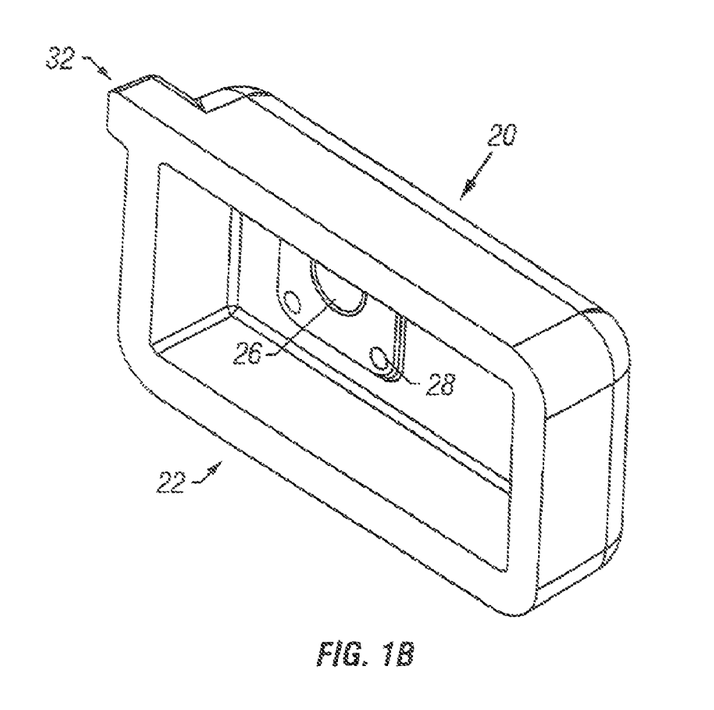
Figure 2:
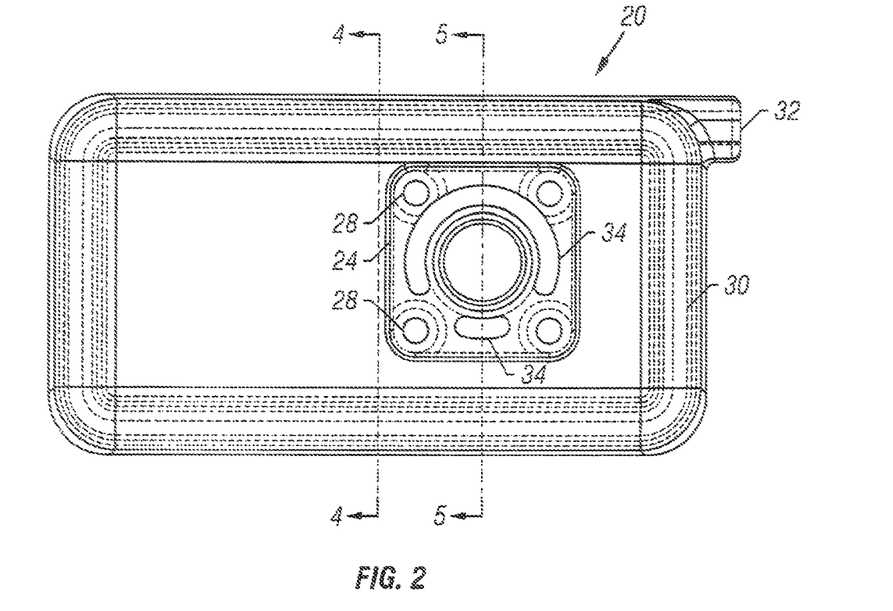
FIG. 2 is a side view of the cooling jacket, viewed from the side adjacent the engine.

Referring first to FIGS. 1A and 1B, cooling jacket 20 is sand or investment cast in a shape designed to form an interior cavity 22 sized to fit about an engine exhaust manifold (not shown) when the cooling jacket is mounted against the engine head. In this embodiment, the jacket includes a mounting boss 24 and associated exhaust port 26 through which exhaust gas flows from the manifold to a downstream exhaust elbow (shown in FIGS. 8A through 13). Accordingly, boss 24 features mounting holes 28 through which fasteners from the exhaust elbow extend into threaded bosses on the exhaust manifold, sandwiching the cooling jacket 20 between the manifold and elbow and sealing the exhaust passage. If desired, the cooling jacket may also be mounted securely to the engine cylinder head by appropriate lugs and fasteners (not shown).

Referring also to FIGS. 2-6, cooling jacket 20 is cast to define an internal cooling passage or cavity 30 in hydraulic communication with a coolant inlet 32, which is attached to a pressurized coolant source (not shown) for circulating coolant through the cooling jacket. From passage 30, the coolant exits the cooling jacket through ports 34 in boss 24 and flows into the exhaust elbow, where it is blended with the exhaust gas. Alternatively, a separate coolant exit port (not shown) may be provided for returning the coolant to its source.

Figure 3:
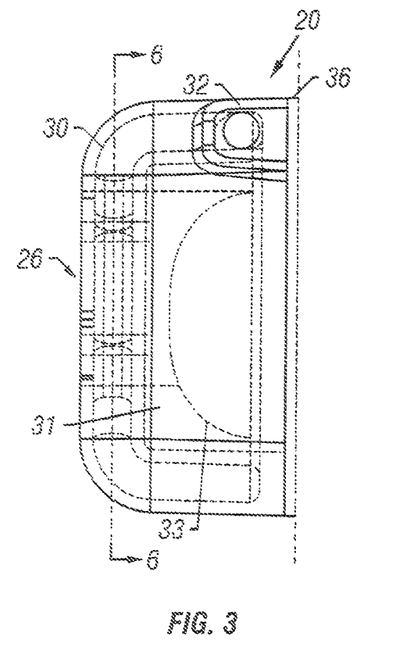
FIG. 3 is an end view of the cooling jacket.
Figure 4:
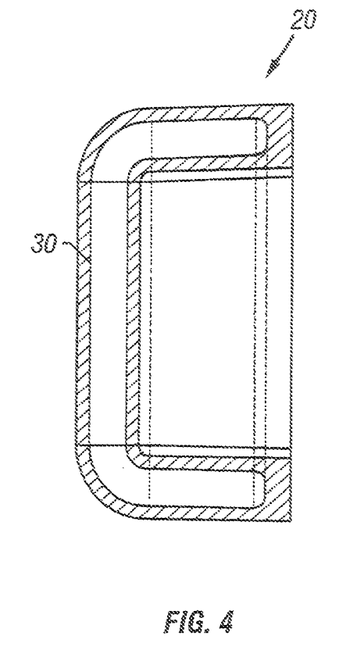
FIGS. 4 and 5 are cross-sectional views, taken along lines 4-4 and 5-5, respectively, in FIG. 2.
Figure 5:
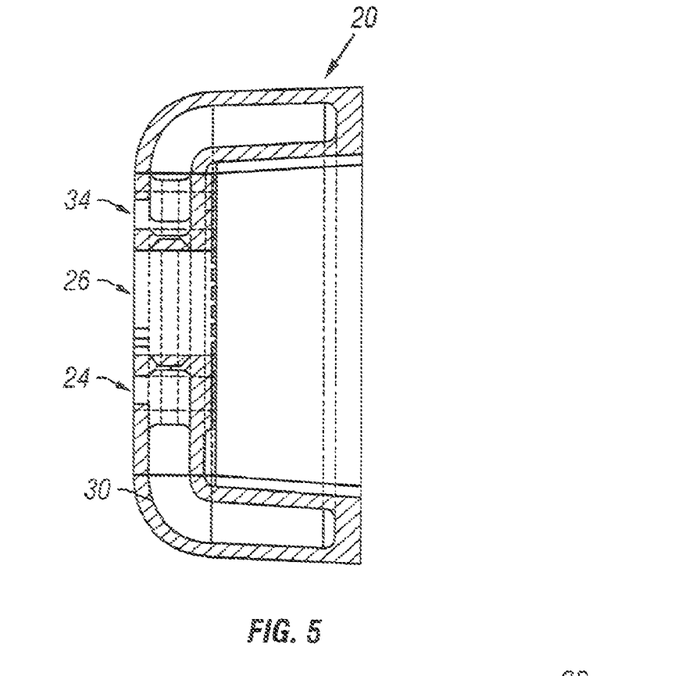
Figure 6:
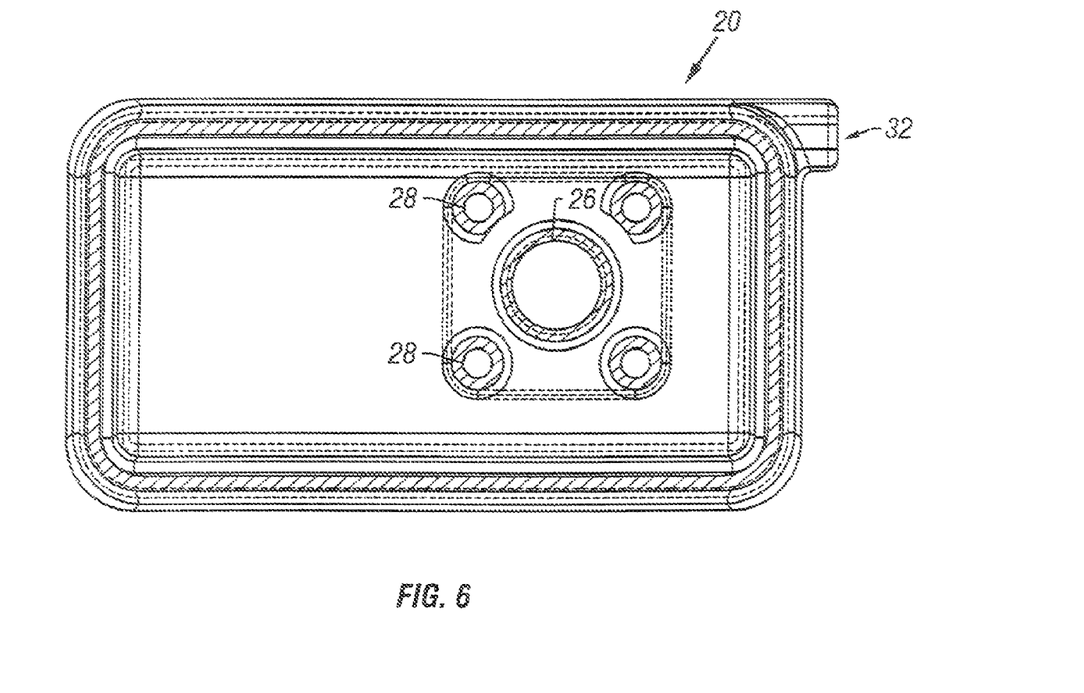
FIG. 6 is a cross-sectional view, taken along line 6-6 in FIG. 3.

As shown in FIG. 3, in this embodiment an air gap 31 is formed between the inner surface of the cooling jacket and the outer surface 33 of the exhaust manifold (shown in dashed outline). Alternatively, an appropriate insulating material, such as glass fiber (not shown), may be packed into this gap and provide insulation against heat conduction between the exhaust manifold and cooling jacket.

Cooling jacket 20 may be cast of any material suitable to the intended environment. For marine applications employing salt water as coolant, a salt resistant aluminum alloy is appropriate. If the cooling jacket is to be mounted directly against a cast iron engine head, or if very high temperatures are anticipated, cast iron may be more appropriate. If aluminum is used and exiting exhaust gas temperatures are high or the exhaust gas is particularly corrosive to aluminum, an iron sleeve may be provided through exhaust port 26.

Figure 7:
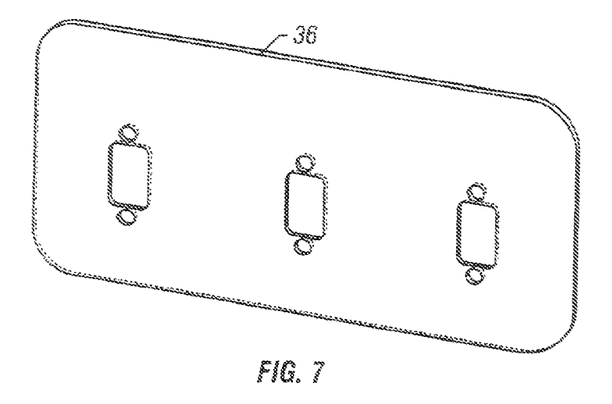
FIG. 7 is a perspective view of a mounting plate for the cooling jacket.

To completely enclose the exhaust manifold, a backing plate 36 may be employed as shown in FIG. 3, and illustrated in FIG. 7. The backing plate is made of flat metal stock, with appropriate exhaust ports placed to align with the exhaust ports of the engine cylinder head. Backing plate 36 is positioned as if it were an exhaust manifold gasket, between the cylinder head and manifold, with the manifold fasteners securing the backing plate in place. The outer edges of the backing plate engage the rim of the cooling jacket, such that there is no appreciable convective air flow through the cooling jacket.

Figures 8A, 8B:
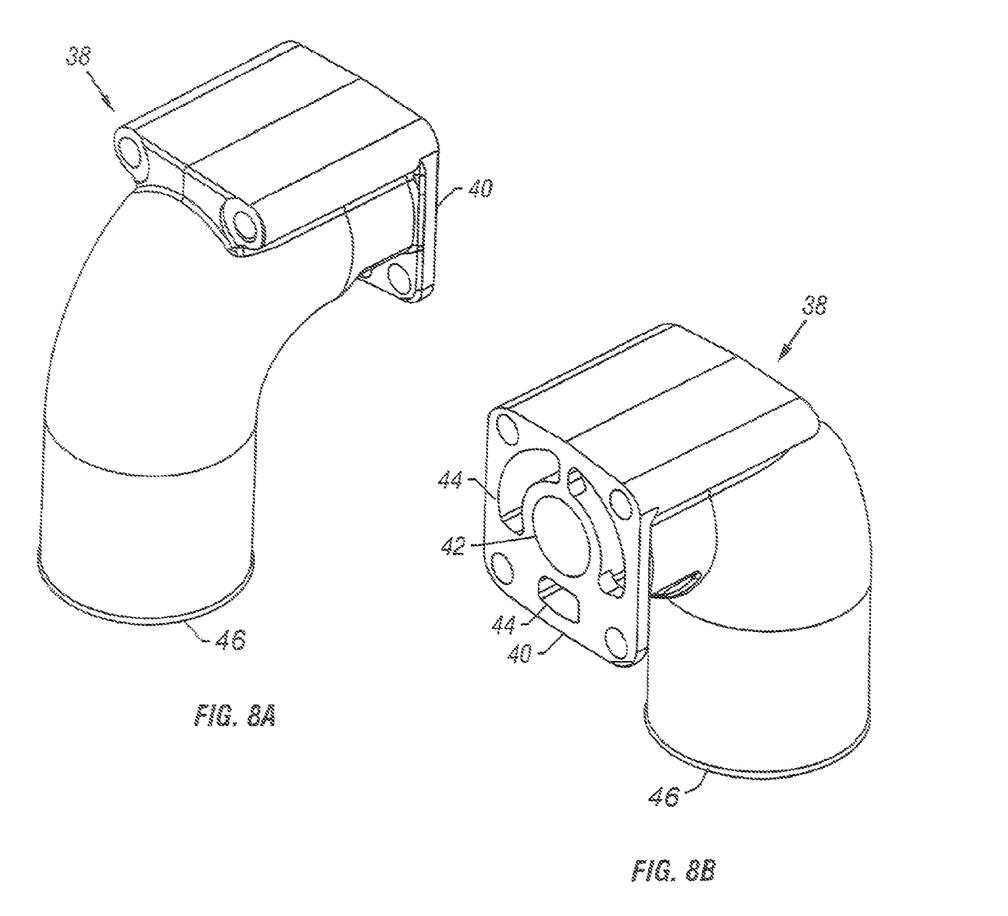
FIGS. 8A and 8B are front and back perspective views, respectively, of an exhaust elbow.
Figure 9:
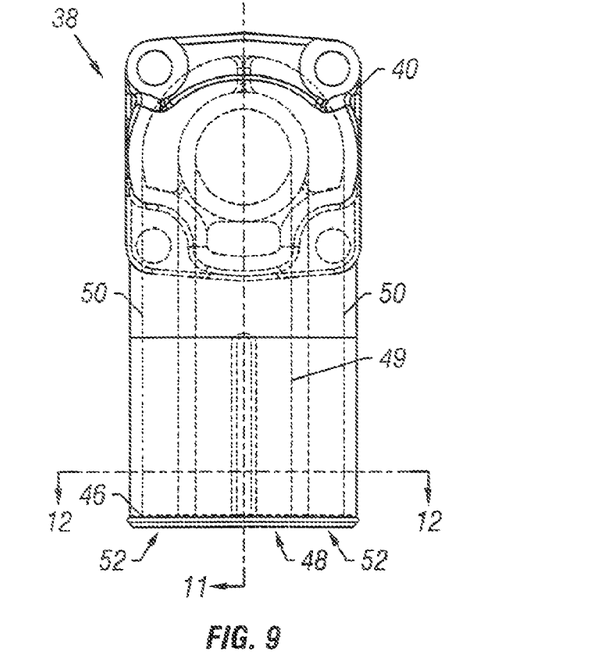
FIG. 9 is an end view of the exhaust elbow, as looking toward the cooling jacket.
Figure 10:
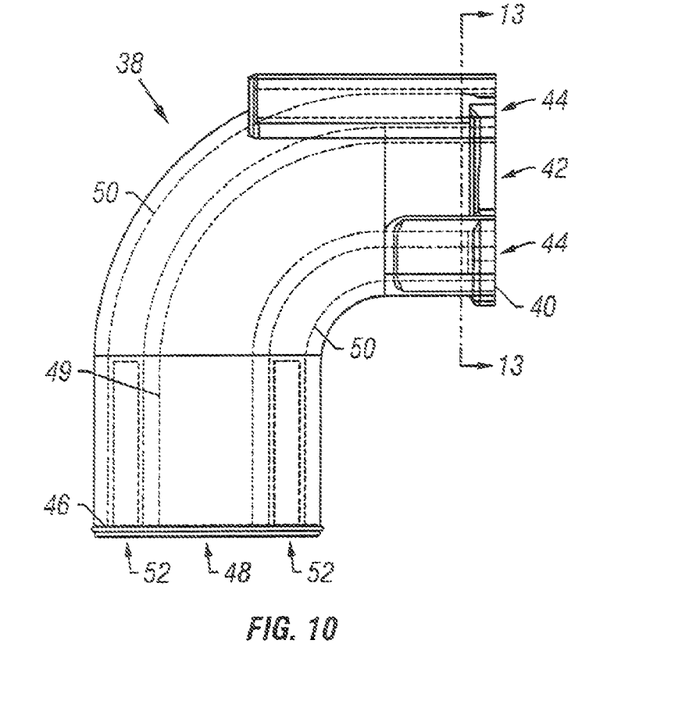
FIG. 10 is a side view of the exhaust elbow.
Figure 11:
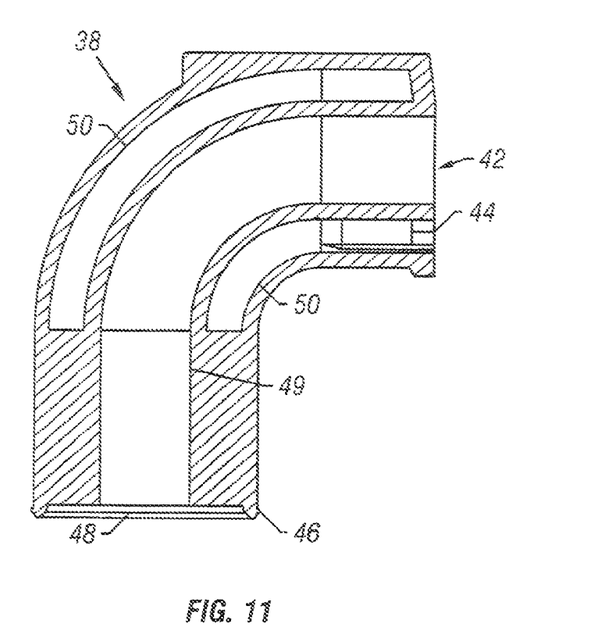
FIGS. 11 and 12 are cross-sectional views, taken along lines 11-11 and 12-12, respectively, in FIG. 9.
Figure 12:
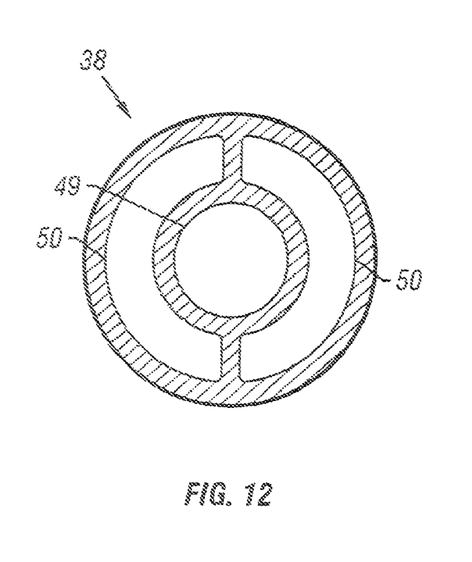
Figure 13:
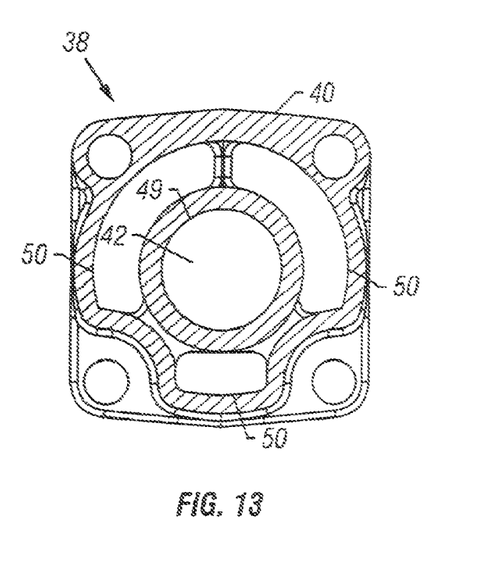
FIG. 13 is a cross-sectional view, taken along line 13-13 in FIG. 10.

Referring now to FIGS. 8A and 8B, exhaust elbow 38 is adapted to mount on boss 24 of cooling jacket 20 (see FIG. 1A) via an appropriate mounting flange 40. Exhaust inlet 42 aligns with exhaust port 26 of the cooling jacket (FIG. 1A), and appropriately positioned coolant inlets 44 align with the coolant outlet ports 34 of the cooling jacket (FIG. 1A), such that both the exhaust gasses and coolant enters exhaust elbow 38 separately. At its downstream end 46, the exhaust elbow is coupled to the remainder of the exhaust system (not shown) in typical fashion.

Referring to FIGS. 9-13, from mounting flange 40 and inlet 42 the exhaust gas flows straight through the exhaust elbow along a central exhaust passage 49 to an exhaust outlet 48. The coolant flows through coolant passage 50 to the downstream end 46 of the exhaust elbow, where it exits the exhaust elbow at outlets 52 and joins the flow of exhaust gas. Coolant passage 50 is not completely annular at either end of the exhaust tube, due to the structural ribs required between the inner and outer portions of the exhaust elbow.

Figure 14:
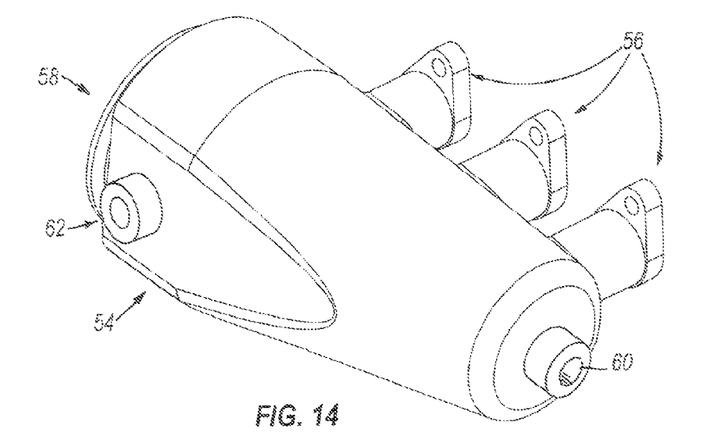
FIG. 14 is a perspective view of a liquid-cooled exhaust manifold sized to house a catalytic conversion element.
Figures 15, 16:
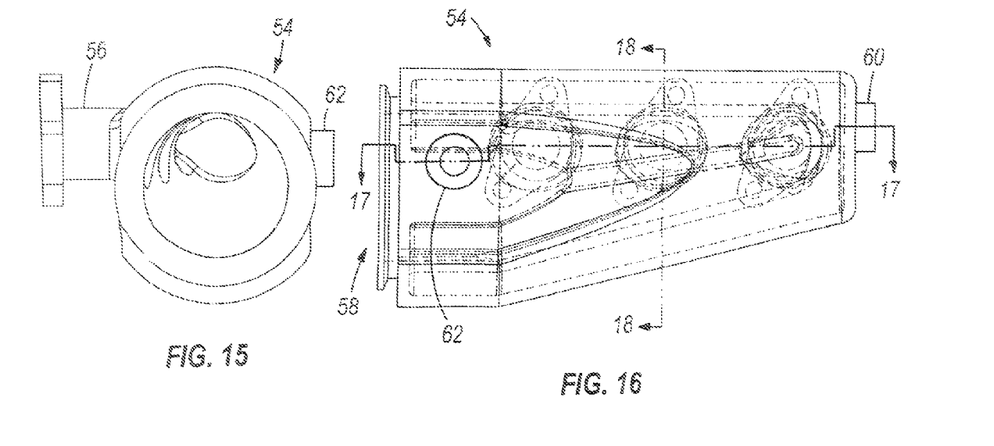
FIGS. 15 and 16 are end and side views, respectively, of the manifold of FIG. 14.

Referring next to FIGS. 14-16, liquid-cooled manifold 54 is produced as a one-piece casting and is designed to merge the exhaust flows from three separate combustion cylinders (not shown) entering the manifold through three respective inlets 56. The merged exhaust flows exit the manifold through exit 58, after having passed through a catalytic conversion element contained within the manifold (discussed further below). Cooling liquid (e.g., fresh water or sea water) enters the manifold through port 60 and exits through port 62.

Figure 17:
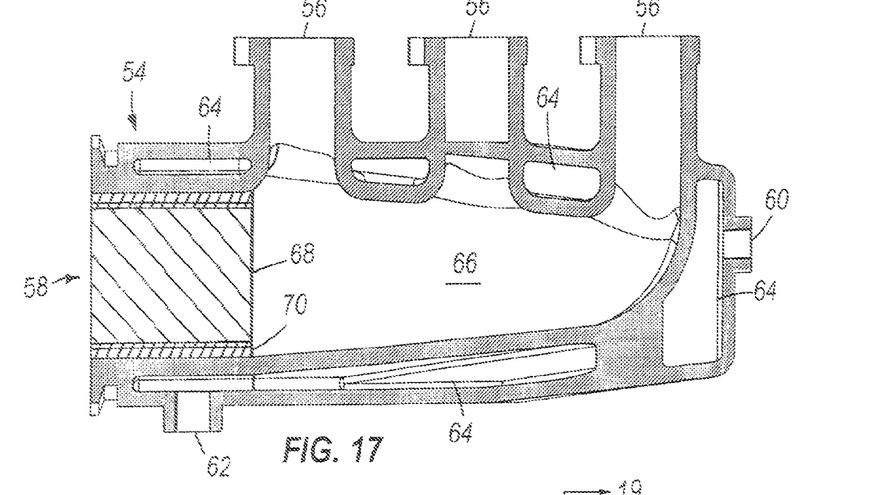
FIGS. 17 and 18 are cross-sectional views, taken along lines 17-17 and 18-18, respectively, in FIG. 16.
Figures 18, 19:
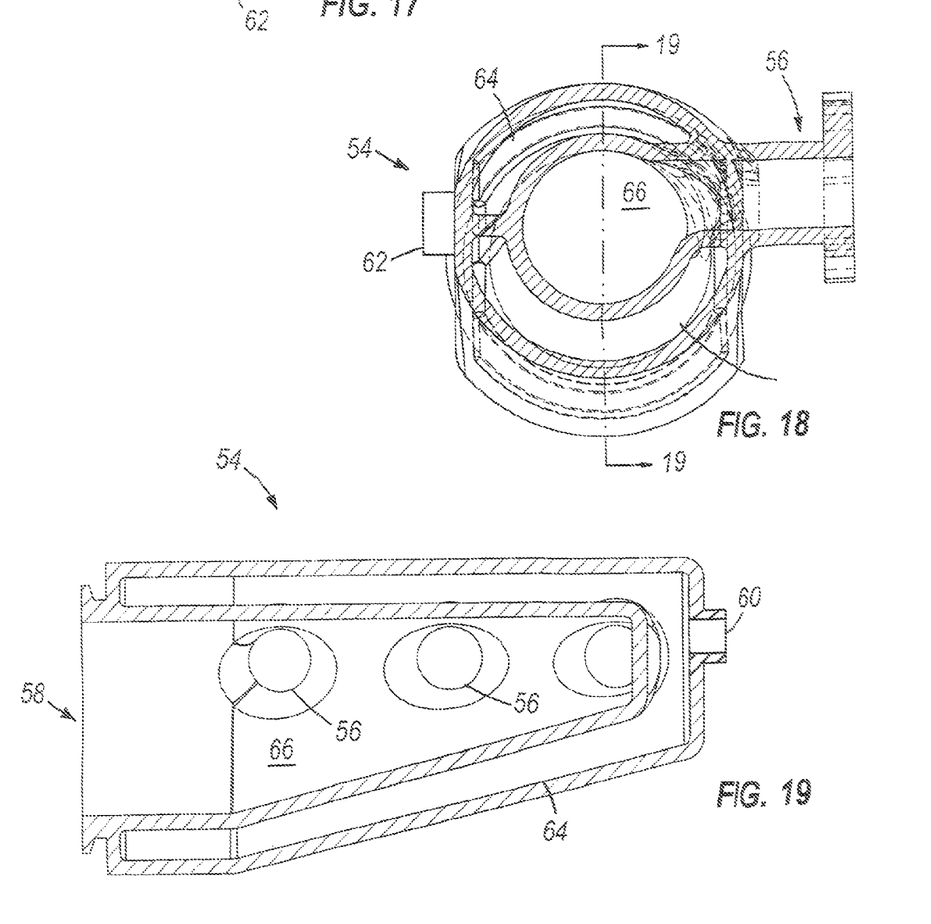
FIG. 19 is a cross-sectional view, taken along line 19-19 in FIG. 18.

As shown in FIGS. 17-19, the manifold housing defines coolant passages 64 extending about the internal exhaust cavity 66, for circulating liquid coolant through the manifold to control manifold housing surface temperature. Shown disposed within the housing just upstream of exhaust exit 58 in FIG. 17 is a catalytic conversion element 68 surrounded by an insulator 70. Element 68 is a cylindrical, porous material designed to promote combustion of combustible exhaust gasses. Such materials are well known in the art of exhaust system design, and a suitable material is available from Allied Signal as their part number 38972. Element 68 has a reasonable porosity and size, at 600 cells per square inch, 3.0 inches in diameter and 2.6 inches in length, to perform its intended function without creating excessive exhaust back pressure. Insulator 70 is a rolled sheet of vermiculite, having a nominal uncrushed thickness of about 5 millimeters. Together, catalytic conversion element 68 and insulator 70 completely span exhaust exit 58, such that all exhaust gas entering manifold 54 is forced to flow through element 68 before exiting the manifold. By disposing the conversion catalyst within the manifold itself, relatively close to the exhaust source, the high temperatures developed by secondary combustion are safely contained within a liquid-cooled housing so as to not present any exposed high temperature surfaces. As shown in FIG. 17, a major length of catalytic element 68 is substantially surrounded by coolant passage 64.

Although not specifically illustrated, it should be understood from the above disclosure that another advantageous arrangement is to house an appropriately sized catalytic conversion element, such as element 68, within a manifold not adapted to circulate cooling fluid, and then surrounding the manifold with a secondary cooling jacket such as that shown in FIGS. 1-6. It should also be understood that manifold 54 may be modified to provide the coolant exit coaxially with the exhaust exit, such that the exiting coolant flows directly into an injection elbow or other downstream exhaust component.

Figure 20:
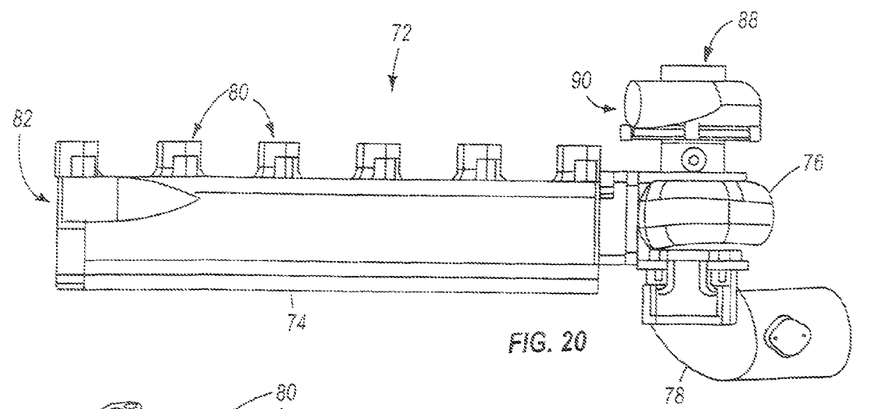
FIG. 20 is a top view of a liquid-cooled exhaust system including a manifold, turbocharger, and injection elbow.
Figure 21:
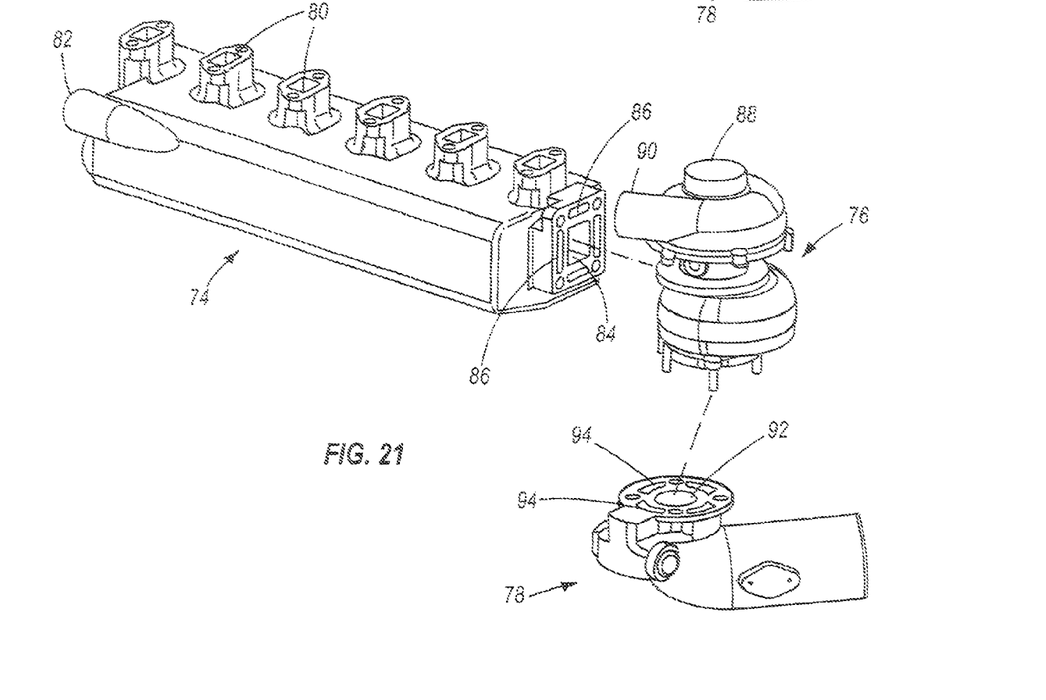
FIG. 21 is an exploded perspective view of the exhaust system of FIG. 20.

Referring now to FIGS. 20 and 21, liquid-cooled exhaust system 72 includes a liquid-cooled exhaust manifold 74, a liquid-cooled turbocharger 76, and a coolant injection elbow 78. The individual exhaust system components are shown separated in FIG. 21. Manifold 74 is configured to receive the exhaust from a bank of six combustion cylinders through exhaust inlets 80, and a flow of coolant through coolant inlet 82. From manifold 74, both the combined exhaust stream and the liquid coolant pass directly into the housing of turbocharger 76 through ports 84 and 86, respectively. The passed coolant helps to control the surface temperature of turbocharger 76, which uses kinetic flow energy from the exhaust gas to boost the pressure of intake air for combustion in the associated engine. Turbocharger 76 accepts atmospheric air through intake 88 and supplies pressurized air to the engine via air outlet 90. From turbocharger 76, both the exhaust stream and the liquid coolant flow directly into injection elbow 78, through ports 92 and 94, respectively. In elbow 78 the coolant is injected into the stream of exhaust to further cool the exhaust. The placement of turbocharger 76 immediately downstream of manifold 74, before the exhaust stream has experienced substantial flow losses, promotes turbocharging efficiency. In addition, flowing the coolant through the turbocharger helps to maintain desirable external turbocharger housing surface temperatures in systems employing downstream water injection, such as for marine applications. It should be understood from the above disclosure that any of the three components shown in FIG. 21 may be equipped with an internal catalytic conversion element, such as element 68 of FIG. 17, and that manifold 74 may be replaced with a standard manifold without internal coolant channels but rather surrounded by a cooled jacket such as the one shown in FIGS. 1-6.

A number of embodiments of the invention have been described. Nevertheless, it will be understood that various modifications may be made without departing from the spirit and scope of the invention. For example, a single manifold/jacket assembly may replace the standard exhaust manifold and contain both internal exhaust passages and internal coolant passages, with an internal air space between the coolant passages and exhaust passages such that many of the benefits of the invention are achieved. Because of direct exposure to high temperature exhaust gasses, however, such a combination version would be limited to particular materials, such as cast iron or steel. Accordingly, other embodiments are within the scope of the following claims:

What is claimed is:

1. A marine engine exhaust system defining an exhaust passage extending from an engine exhaust manifold inlet to an exhaust system outlet, the exhaust system comprising:
    an exhaust manifold configured to merge multiple exhaust flows into a merged exhaust flow; and
    a catalytic conversion element arranged to intercept and catalyze the merged exhaust flow;
    wherein the exhaust system also defines a raw water coolant passage extending from a seawater inlet, through the manifold to a coolant exit open to the exhaust passage downstream of the catalytic conversion element, the coolant exit configured to cause seawater to be injected into the exhaust within the exhaust system;
    wherein the coolant passage extends between the catalytic conversion element and an adjacent external exhaust system surface, to remove heat generated by the catalytic conversion element and avoid excessive exhaust system surface temperatures; and
    wherein the coolant passage is spaced from the engine cylinder head.

2. The marine engine exhaust system of claim 1 wherein the seawater inlet is spaced from a block of the engine.

3. The marine engine exhaust system of claim 2 wherein the seawater inlet is defined by the manifold.

4. The marine engine exhaust system of claim 1 wherein the catalytic conversion element is disposed within the manifold.

5. The marine engine exhaust system of claim 4 further comprising an insulator separating the catalytic conversion element from an inner surface of the manifold.

6. The marine engine exhaust system of claim 1 wherein a major length of the catalytic conversion element is substantially surrounded by the coolant passage.

7. The marine engine exhaust system of claim 1 wherein the coolant passage extends along opposite sides of the catalytic conversion element.

8. The marine engine exhaust manifold of claim 1 further comprising a seawater injection elbow mounted downstream of the catalytic conversion element and configured to inject the seawater into the exhaust flow.

9. The marine engine exhaust system of claim 1 wherein the catalytic conversion element is disposed adjacent a merging of the multiple exhaust flows.

\* \* \* \* \*